United States Patent
Jupe et al.

(10) Patent No.: US 11,153,244 B1
(45) Date of Patent: Oct. 19, 2021

(54) DIGITAL CONVERSATIONS

(71) Applicant: United Services Automobile Association (USAA), San Antonio, TX (US)

(72) Inventors: Vanessa Jupe, San Antonio, TX (US); Jared Stephens, San Antonio, TX (US); Macdonald Etugbo, Helotes, TX (US); Christopher Genzardi, Austin, TX (US); Jeffrey Kissner, San Antonio, TX (US); Anoop Shridhar Warrier, Sandy Springs, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 45 days.

(21) Appl. No.: 16/054,607

(22) Filed: Aug. 3, 2018

Related U.S. Application Data

(60) Provisional application No. 62/540,775, filed on Aug. 3, 2017.

(51) Int. Cl.
  *H04L 12/58* (2006.01)
  *G06Q 40/06* (2012.01)

(52) U.S. Cl.
  CPC ............. *H04L 51/16* (2013.01); *G06Q 40/06* (2013.01); *H04L 51/04* (2013.01)

(58) Field of Classification Search
  CPC .......... H04L 51/16; H04L 51/04; G06Q 40/06
  See application file for complete search history.

(56) References Cited

U.S. PATENT DOCUMENTS

| 62,462,010 | * | 2/2017 | Bui | |
| 62,462,023 | * | 2/2017 | Bui | |
| 10,437,928 B2 | * | 10/2019 | Bhaya | G06F 21/6254 |
| 2005/0091056 A1 | * | 4/2005 | Surace | H04M 3/4936 |
| | | | | 704/270.1 |
| 2017/0243278 A1 | * | 8/2017 | Hyde | G06N 5/04 |
| 2018/0239959 A1 | * | 8/2018 | Bui | G06F 16/345 |
| 2018/0285595 A1 | * | 10/2018 | Jessen | H04L 67/14 |

FOREIGN PATENT DOCUMENTS

KR  20190101492 A  *  8/2019  ........... H04L 51/063

OTHER PUBLICATIONS

Craig Iskowitz, Comparing The Best Digital Advice "Robo-Advisor" Platforms For RIAs, Jan. 15, 2018, Kitches (Year: 2018).*

* cited by examiner

*Primary Examiner* — Hani M Kazimi
*Assistant Examiner* — Alison L. Lamb
(74) *Attorney, Agent, or Firm* — Fish & Richardson P.C.

(57) ABSTRACT

Methods, systems, and apparatus, including computer programs encoded on computer storage media, for a digital conversation is described. One of the methods includes guiding a user through a directed conversation having a plurality of flows, each flow including at least one statement to be made by a digital advisor. The method includes receiving user input as part of the directed conversation. The method includes selecting one of the flows based on the received user input. The method also includes storing at least some of the information provided by the user in a data store.

20 Claims, 22 Drawing Sheets

1ST HOME

— 504

| | | | |
|---|---|---|---|
| Summary | History | Portfolio | Activity |

Transactions — 506

| Date | Description | Amount |
|---|---|---|
| Aug 05, 2016 | Dividend – Reinvest BOND ETF | ($1.45) |
| Aug 05, 2016 | Dividend – Cash BOND ETF | $1.45 |
| Aug 04, 2016 | Fee | ($0.47) |
| July 25, 2016 | Corporate Action | $0.00 |
| Jul 15, 2016 | Buy – INTL STK ETF | ($451.34) |
| July 15, 2016 | Buy – BOND ETF | ($786.85) |

| MAIN | DIA     810 | Member | Destination |
|---|---|---|---|
| 1 | Hi *[MEMBER]*! | 812 | 820 |
| | I'm your Digital Investment Adviser. It's nice to meet you! | | |
| | | *[A]* It's nice to meet you, too! Let's get started. | 2 |
| | | *[B]* Digital? Are you a human? | Alternate 1 |
| 822<br>2 | The first thing you should know is that investing is intended to be for the long term. In other words, you should keep this money invested for at least 5 years. | 814 | 824 |
| | Does this sound ok to you? | | |
| | | *[A]* Sounds good. Let's keep going. | 3 |
| | | *[B]* I'm not sure I understand. Tell me more. | Alternate 2 |
| | | | |
| 3 | Great! Let's name your goal. | | |
| | Keep in mind you can always change the name later since we won't be managing the money specific to what you name it. | 816 | |
| | What do you want to name your goal? | | |
| | | *[BUTTON]* Enter your goal name.<br>*[INPUT]*<br>*[FIELD LABEL]* Such as Retirement, Vacation Home, etc. | |
| | | *[CONFIRM]* This is what I'd like to invest for. | 4 |
| 4 | Before we talk about money, I'd like to make sure you understand that in order to start investing you should have an emergency fund, as well as room in your budget and no problems paying your bills. | | |
| | | *[A]* OK, that works for me. | 5 |
| | | *[B]* I'm not sure I understand. Tell me more. | Alternate 3 |
| 5 | What is your target end goal amount you are trying to save toward? We don't need this information to manage your account, but it is helpful to track your progress. | | |

| MAIN | DIA | Member | Destination |
|---|---|---|---|
|  | No worries if you do not have an exact amount. An approximate amount is more than ok as you will be able to change this later. |  |  |
|  |  | [INPUT] $  818 |  |
|  |  | [CONFIRM] About that much. | 6 |
|  |  | [IF GOAL ENTERED IS LESS THAN $2,000] | Alternate 4 |
| 6 | Do you know how much you want to start with today? Keep in mind the minimum amount is $2,000. |  |  |
|  |  | [A] Yes. | 7A |
|  |  | [B] No, I'm just looking for your suggestion. | 7B |
| 7A | How much do you have to start with today? |  |  |
|  |  | [INPUT] $ [FIELD LABEL] At least $2,000 |  |
|  |  | [CONFIRM] This much. | 8 |
|  |  | [IF STARTING AMOUNT IS GREATER THAN GOAL AMOUNT] | Alternate 5 |
| 7B | Not a problem at all, let's keep going. |  | Goes to 8 |
| 8 | Ok, I can help you in a couple different ways. One is to help you determine your risk level and then offer you a recommendation. |  |  |
|  | The other way is to show you your investment options and let you pick. It's up to you. |  |  |
|  |  | [A] I would like help in choosing. | 9 |
|  |  | [B] I know my risk level. Let me pick. | Alternate 6 |
| 9 | OK, let's get a sense of the type of investment choices I can offer you. |  |  |
|  | One way to narrow down your choice is to determine your comfort level for gaining and losing money on your investment -- in other words, the risk. Generally, the more potential reward an investment has, the more risk of loss it has. |  |  |

| MAIN | DIA | Member | Destination |
|---|---|---|---|
| | Which of these statements best describes you? | | |
| | | Slider with "Less Risk/Reward" on the left, "More Risk/Reward" on the right. *[MEMBER MUST SELECT ONE]* | |
| | 820 → | *[SLIDER CHOICE]* Preservation of Capital (less risk) *[BELOW SLIDER]* I'm not taking any chances. I don't want any risk of losing my money. | Alternate 7 |
| | | *[SLIDER CHOICE]* Conservative (less risk) *[BELOW SLIDER]* I like to play it safe. I'd be OK with little gain if it meant little loss. | 10 |
| | | *[SLIDER CHOICE]* Moderately Conservative *[BELOW SLIDER]* I'm ready to invest, but I want to stay close to shore. I'm OK with modest returns if it means taking only a modest risk. | 10 |
| | | *[SLIDER CHOICE - DEFAULT]* Moderate *[BELOW SLIDER]* I like a middle-of-the-road approach. I want a chance for good returns and I know that it takes some risk of loss to get them. | 10 |
| | | *[SLIDER CHOICE]* Moderately Aggressive *[BELOW SLIDER]* Let's take a chance. I'm OK with the risk of large loss because my primary focus is the chance for higher long-term returns. | 10 |
| | | *[SLIDER CHOICE]* Aggressive (more risk) *[BELOW SLIDER]* Full speed ahead. I'm looking for the chance for larger rewards and I know that means I have to take the risk of significant losses. | 10 |
| | | *[SLIDER CHOICE]* Very Aggressive (more risk) *[BELOW SLIDER]* I'm ready for a wild ride. I'm OK with the risk of substantial loss and big ups and downs for the chance at bigger gains in the long run. | 10 |

| MAIN | DIA | Member | Destination |
|---|---|---|---|
| | | [CONFIRM] Done | 10 |
| 10 | Got it, thanks. Now I have all I need to provide you with an investment portfolio tailored to your level of risk. | | |
| | Keep in mind as with any investment, there is no guarantee of future performance and there is a chance of making money, but there is always the risk of losing money too. | | |
| | | [A] Got it. Show me your suggestion. | 11 |
| | | [B] What is an investment portfolio? | Alternate 8 |
| 11 | Here is my suggestion: | | |
| | | Slider with "Less Risk/Reward" on the left, "More Risk/Reward" on the right. This time, it has DIA's recommended portfolio filled in. | |
| | | [Conservative Portfolio, Moderately Conservative Portfolio, Moderate Portfolio, Moderately Aggressive Portfolio, Aggressive Portfolio, Very Aggressive Portfolio] | 12 |
| | | | 12 |
| | | | 12 |
| | | | 12 |
| | | [Depending on DIA's recommendation] This portfolio is less risky than the one I suggested. | 12 |
| | | | 12 |
| | | [CONFIRM] I'm interested in this one. | 12 |
| | | [IF MEMBER SELECTS A PORTFOLIO THAT WAS NOT RECOMMENDED] | Alternate 9 |
| 12 | OK, got it. That wasn't so bad, was it? | | |
| | Now you're ready to open your account and get started toward your goal. | | |
| | The next step is the application, where we will need to ask you a few more questions and find out how you plan to fund your new investment. | | |
| | | [CONFIRM] Take me to the application. | SONA |

| ALT 1 | DIA | Member | Destination |
|---|---|---|---|
| 1 | I'm USAA's Digital Investment Adviser - an automated application designed to help you with investing. | | |
| | Although I'm not a human, I've been programmed to guide you through the investment selection process and give you a recommendation. | | |
| | | [A] OK, got it. Let's get started on my investments. | Main 2 |
| | | [B] I'm still not sure. Tell me | 2 |
| 2 | The Digital Investment Adviser was created to give you personalized service, no matter what time of day it is or where you are. Plus, it allows us to keep your investing costs low. | | |
| | | [A] I got it now. | Main 2 |
| | | [B] I would prefer talking to a human about investing. | 3 |
| 3 | Give us a call at 1-866-998-2350 to speak to a real human. I promise not to take it personally | | |

FIG. 9

| ALT 2 | DIA | Member | Destination |
|---|---|---|---|
| 1 | Since the investment market moves up and down on a regular basis, it is best to make sure your goal is at least 5 years away to help cater to these ups and downs. | | |
| | | [A] OK, got it. Let's keep going. | Main 3 |
| | | [B] I'd rather look into a savings account. | SAVINGS |

FIG. 10  1000

| ALT 4 | DIA | Member | Destination |
|---|---|---|---|
| 1 | Just so you know, the minimum amount to invest with this product is $2,000. | | |
| | Would you like to go back and change your end goal amount to something greater than $2,000? | | |
| | | [A] Yes I do. | Main 5 |
| | | [B] No I don't. | 2 |
| 2 | Not a problem at all. However I would then recommend checking out our USAA Savings Accounts. | | |
| | | [A] Sounds great. Show me more about that. | SAVINGS |
| | | [B] No, thank you. | DIA STORE |

| ALT 3 | DIA | Member | Destination |
|---|---|---|---|
| 1 | In order to start investing, it is best to make sure you have 3-6 months of income set aside to cover unforeseen expenses like car repairs or a possible job loss. | | |
| | If you do not have enough money for these situations, or if you're struggling to pay your bills each month, I would suggest creating an emergency fund before beginning to invest. | | |
| | | [A] I understand. Let's keep going. | Main 5 |
| | | [B] That emergency fund sounds interesting. | 2 |
| 2 | Sure thing. Let's get you over to USAA Bank, as our savings accounts are a great way to start that emergency fund. | | |
| | | [A] Sounds great. Show me more about that. | SAVINGS |
| | | [B] No, thank you. | STORE |

| ALT 6 | DIA | Member | Destination |
|---|---|---|---|
| 1 | Here are the portfolios we have available. | | |
| | Keep in mind as with any investment, there is no guarantee of future performance and there is a chance of making money, but there is always the risk of losing money too. | | |
| | | Slider with "Less Risk/Reward" on the left, "More Risk/Reward" on the right.<br>[MEMBER MUST SELECT ONE]<br>*[Conservative Portfolio, Moderately Conservative Portfolio, Moderate Portfolio, Moderately Aggressive Portfolio, Aggressive Portfolio, Very Aggressive Portfolio]* | |
| | | [CONFIRM] I'm interested in this one. | 12 |

| ALT 7 | DIA | Member | Destination |
|---|---|---|---|
| 1 | If this statement best describes you then investing may not be right for you. | | |
| | However, I still have a couple of options to consider. | | |
| | You can select a different description or I could point you to something that might better fit your needs. | | |
| | | [A] I'd like to select a different description. | Main 9 |
| | | [B] Please point me in the right direction. | 2 |
| 2 | Not a problem at all. I believe you should consider a savings account to start. | | |
| | | [CONFIRM] Take me to USAA | SAVINGS |

FIG. 14 — 1400

| ALT 8 | DIA | Member | Destination |
|---|---|---|---|
| 1 | An investment portfolio is simply the mix of investments like ETFs and mutual funds that are inside the account. | | |
| | Don't worry, you don't have to figure out what things to buy. We do that for you, and we'll be sure to match the level of risk you're willing to take. | | |
| | | [CONFIRM] Okay, show me your investment suggestion. | Main 11 |

FIG. 15 — 1500

| ALT 9 | DIA | Member | Destination |
|---|---|---|---|
| 1 | *[ONE OF THE FOLLOWING DISPLAYS, BASED ON THE NEW SELECTION]* | | |
| | *[CONSERVATIVE]*<br>Just to be sure, you have chosen a portfolio different than my suggestion. After seeing the different portfolios, you changed your risk tolerance to Conservative meaning you like to play it safe. You'd be OK with little gain if it meant little loss.. | | |
| | *[MODERATELY CONSERVATIVE]*<br>Just to be sure, you have chosen a portfolio different than my suggestion. After seeing the different portfolios, you changed your risk tolerance to Moderately Conservative meaning you're ready to invest, but want to stay close to shore and you're OK with modest returns if it means taking only a modest risk.. | | |

FIG. 16A

1600a

| ALT 9 | DIA | Member | Destination |
|---|---|---|---|
| | *[MODERATE]* Just to be sure, you have chosen a portfolio different than my suggestion. After seeing the different portfolios, you changed your risk tolerance to Moderate meaning you like a middle-of-the-road approach. You would like the chance for good returns and know that it takes some risk of loss to get them.. | | |
| | *[MODERATELY AGGRESSIVE]* Just to be sure, you have chosen a portfolio different than my suggestion. After seeing the different portfolios, you changed | | |
| | *[AGGRESSIVE]* Just to be sure, you have chosen a portfolio different than my suggestion. After seeing the different portfolios, you changed your risk tolerance to Aggressive meaning you're ready to move full speed ahead because you want the chance for larger rewards and you know that it means you have to take the risk of significant loss.. | | |

| ALT 9 | DIA | Member | Destination |
|---|---|---|---|
| | *[VERY AGGRESSIVE]* Just to be sure, you have chosen a portfolio different than my suggestion. After seeing the different portfolios, you changed your risk tolerance to Very aggressive meaning you're ready for a wild ride. You can stomach the risk of substantial losses and big ups and downs for the chance at bigger gains in the long run.. | | |
| | | *[A]* Yes, I'm sure. | Main 12 |
| | | *[B]* I'm not sure. I'd like to take another look at the | Main 11 |

| ALT 5 | DIA | Member | Destination |
|---|---|---|---|
| 1 | It looks like you've entered an amount greater than the end goal amount you set earlier. | | |
| | Would you like to go back and change your end goal amount of *[$X]* or your initial investment amount of *[$X]* ? | | |
| | | *[A]* I would like to change my end goal amount. | Main 5 |
| | | *[B]* I would like to change my initial investment amount. | Main 7A |

DIGITAL CONVERSATIONS

CROSS-REFERENCE TO RELATED APPLICATION

This application claims priority under 35 U.S.C. § 119 to U.S. Application Ser. No. 62/540,775, filed on Aug. 3, 2017, and entitled "DIGITAL CONVERSATIONS," the entire contents of which is incorporated by reference herein.

BACKGROUND

Modern businesses offer an array of services (e.g., financial services) that are electronically accessible, such as via the Internet. For example, modern businesses can offer banking and savings services, investment services, insurance services, mortgage services, annuities products, and other services through the Internet.

SUMMARY

This specification describes technologies relating to digital conversations.

In one implementation, the subject matter described in the detailed description includes methods that include the acts of guiding a user through a directed conversation having a plurality of flows, each flow including at least one statement to be made by a digital advisor. The methods include the act of receiving user input as part of the directed conversation. The methods include the act of selecting one of the flows based on the received user input. The methods also include the act of storing at least some of the information provided by the user in a data store.

In some implementations, the method can include one or more of the following features, alone or in combination. Each flow can be generated based on a table that defines statements and inputs to be provided by the user. The directed conversation can include statements and responses determined by regulatory requirements. The directed conversation can be presented in a user interface, and at least one flow in the plurality of flows can be updated without altering the user interface. The methods can include the acts of determining an interest of the user based on received user input and personalizing the user's experience based on the determined interest. The methods can include the act of establishing an account to achieve a financial goal based on the conversation.

The details of one or more embodiments of the subject matter described in this specification are outlined in the accompanying drawings and the description below. Other features, aspects, and advantages of the subject matter will become apparent from the description, the drawings, and the claims.

BRIEF DESCRIPTION OF THE DRAWINGS

FIG. 5 illustrates an example of a user interface displaying activity associated with the goal.

FIGS. 8A-D are a table defining an example scripted conversation for a main path of the digital investment advisor.

FIGS. 9-15, 16A-C, and 17 are tables defining example alternate scripted conversations for a main path of the digital investment advisor.

Like reference numbers and designations in the various drawings indicate like elements.

DETAILED DESCRIPTION

Digital conversations can enable an organization to automatically interact with their users in an easy to understand and seamless manner. These conversations have the advantage that they are easily extendable and modifiable without requiring a large expenditure of information technology resources (such as programming). For example, the contents of the conversation can be altered without requiring the development of additional screens.

One example that illustrates the flexibility and advantages introduced with digital conversations is using the digital conversation to gather information about an individual's goals and aspirations.

While the goals and aspirations cannot be directly financial, often the goals include a financial aspect, for example, vacations and retirement must be paid for out of savings and personal income. While some people can use a financial planner to help them plan for retirement, few engage with a financial planner for smaller goals. An automated digital investment advisor can work with the individual to help them save and plan to meet their short, medium, and long-term personal goals.

A user can interact with an automated digital investment advisor using digital conversation in a conversational interface, for example, similar to an instant message, chat, or SMS messaging interface. The user can be, for example, a customer, a potential customer, or member of a financial institution that offers the digital investment advisor.

Figure 1A:
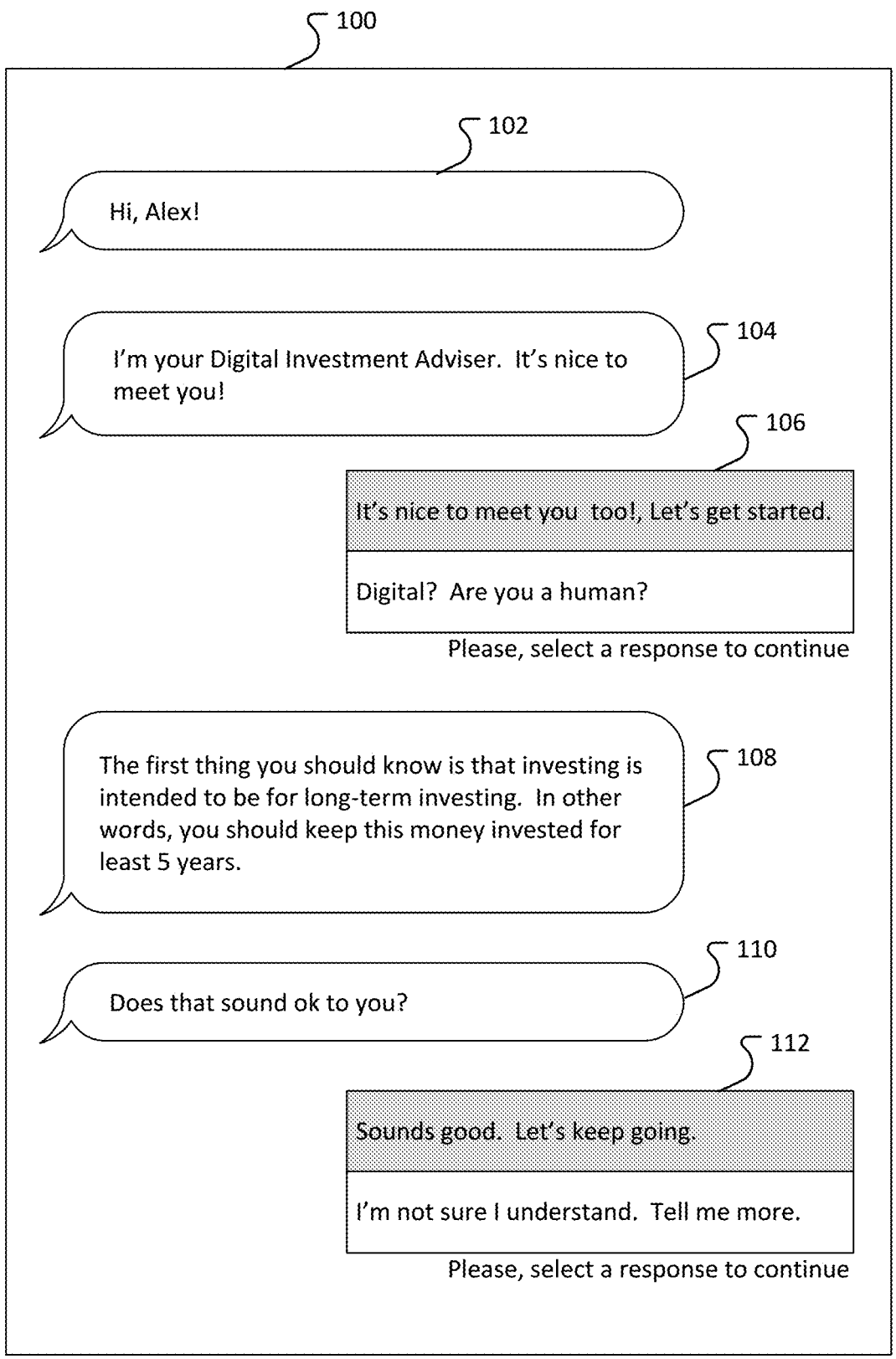
FIGS. 1A-C illustrates an example conversation between a digital investing assistant and a user.
Figure 1B:
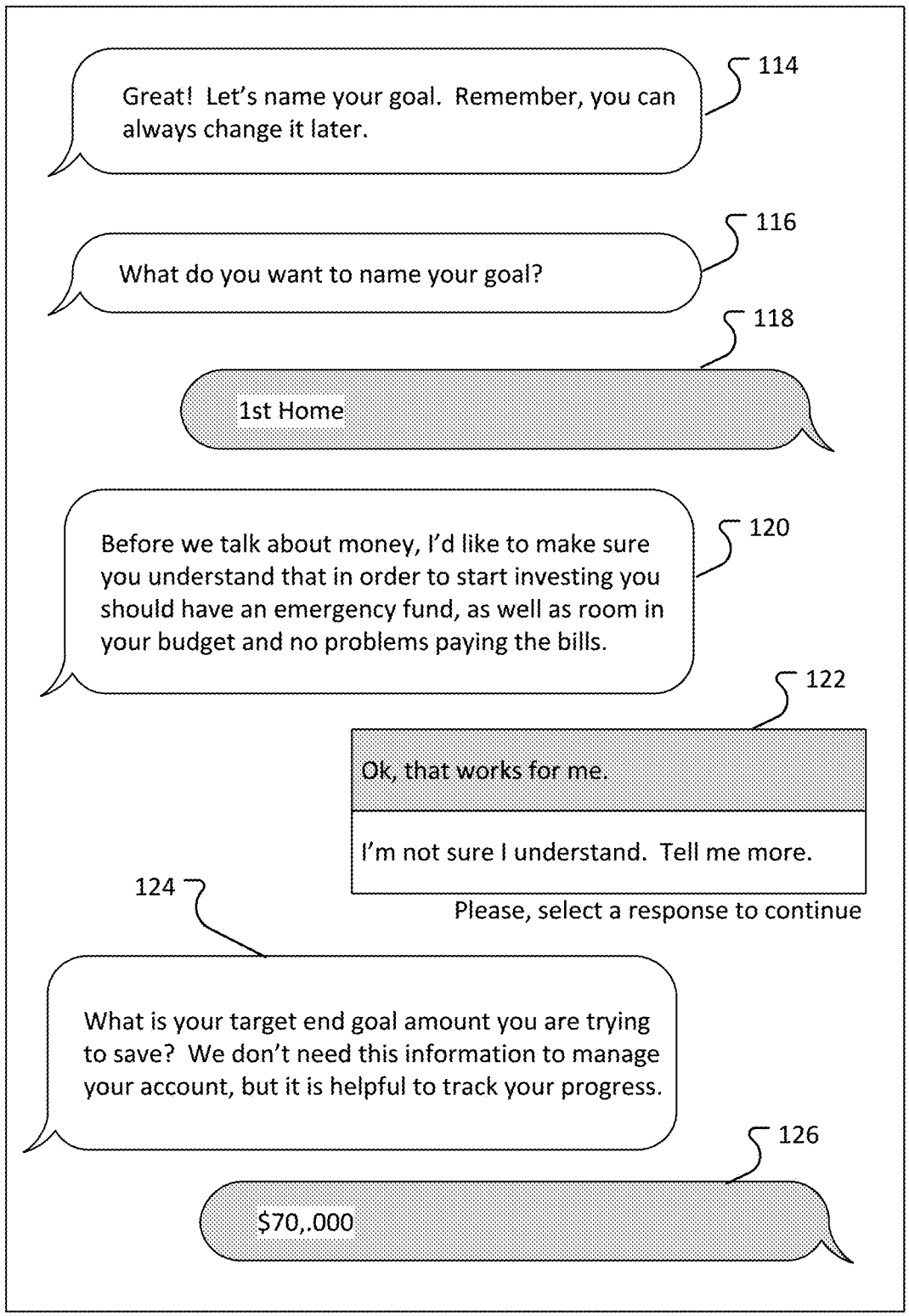
Figure 1C:
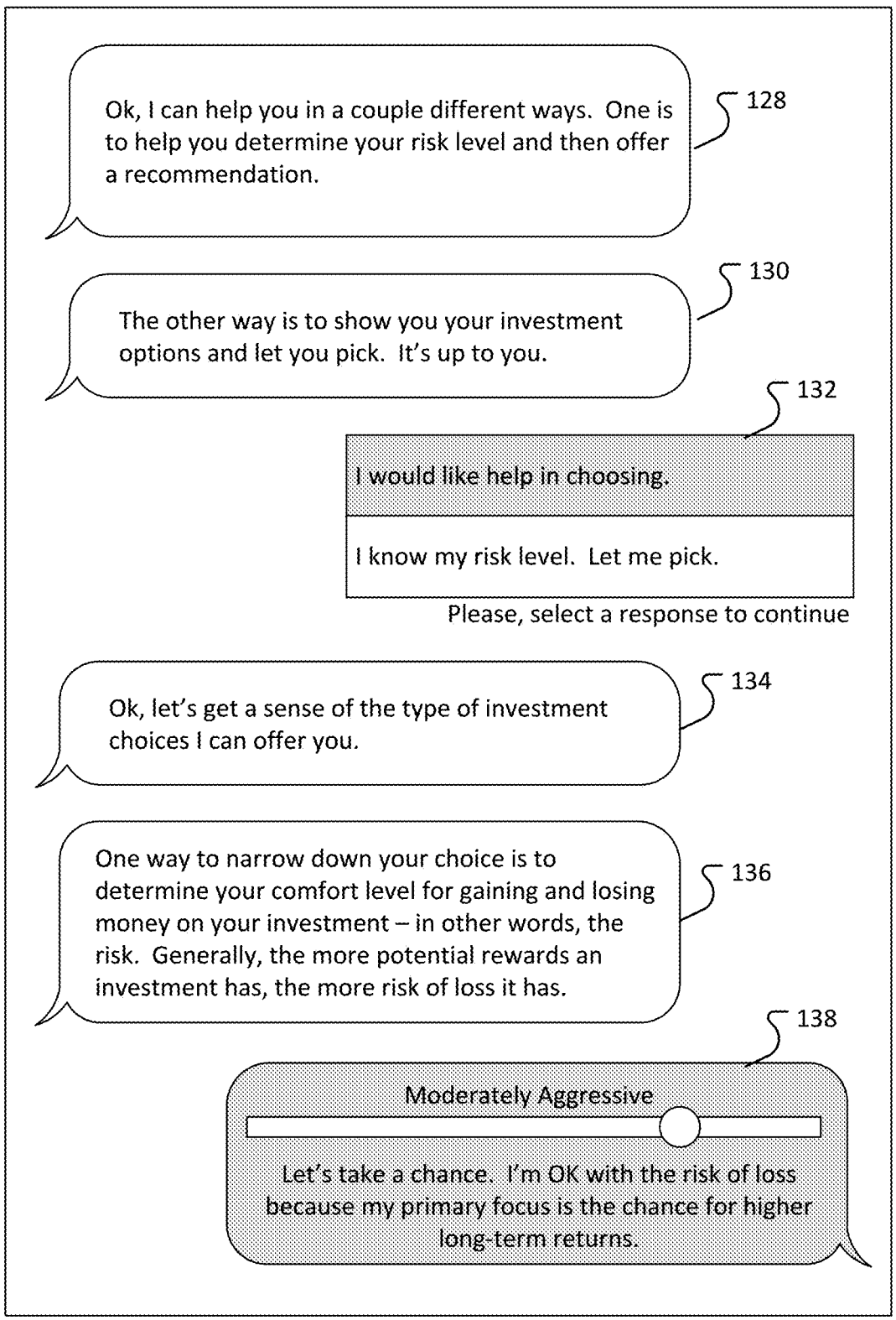

FIGS. 1A-C illustrates an example conversation between a digital investing assistant and a user. The interactions between the user and the digital investing assistant can be modeled as a push notification text, short messaging service (SMS), chat, or instant messaging application. Text messaging, or texting, is the act of composing and sending electronic messages, typically consisting of alphabetic and numeric characters, between two or more users of mobile phones, fixed devices (e.g., desktop computers) or portable devices (e.g., tablet computers or smartphones). While text messages are usually sent over a phone network, text messages can also be sent via a network, such as the Internet. Similarly, instant messaging is a type of online chat that offers real-time text transmission over the Internet. Instant messaging includes short messages transmitted bi-directionally between two parties.

While the underlying mechanisms behind text messaging and instant messaging vary, the user experience of both applications are similar. A user is presented with a chat window 100. The chat window 100 displays the conversation between the user and the digital investing assistant. The user's messages are displayed on one side (generally, but not always, the right) while the counterparties messages are displayed on the other side (generally, but not always, the left).

The chat window 100 can be included in a web page, an application (for example, executing on a mobile device), or presented to the user using another automated means.

In this example, the digital investment advisor guides the user through a guided conversation using a messaging interface. The digital investment advisor can provide information to the user or can pose questions to the user. Comments by the digital investment advisor can be personalized to the user, for example, the initial message 102 refers to the user by name.

In this example, the digital assistant introduces 104 itself to the user. The user is given the option of continuing toward the eventual investment recommendations or can ask a question as to the nature of the digital investment assistant 106. At this point, the guided conversation can split between the main path (which leads closer to the eventual goal of the application, for example, to provide investment advice) and diversionary paths, which can provide different information to the user or can direct the user toward a different product or system capability. In some scenarios, the diversionary path can navigate the user to a different part of the application or a different application.

In this example, the top answer directs the user toward the main path, while the second option temporarily diverts the user toward dialog explaining the nature of the digital advisor directs the user to a diversionary path.

The scripted conversation can provide the user with a number of different ways to interact with the digital investment assistant. For example, the user can select between a number of different options. In some implementations, the user can be able to provide text in response to particular questions, such as the name of the user's goal (for example, dialog 118 of FIG. 1B). In some implementations, the user can select between a number of different options, for example, by using a drop-down list or a slider (as shown, for example, with dialog 138 of FIG. 1C).

The interactive chat window 100 can be used to both convey information to the user and obtain information from the user. For example, the chat window 100 can give the user information and obtain responses that are used to convey advice or to comply with rules and regulations such as the benefits of maintaining an emergency fund and disclosures about the risk inherent in investing.

For example, referring to FIG. 1A, the digital investment advisor provides information about an expected length of an investment term 108. The digital investment provider can also request acknowledgment from the user 110, which the user can provide using a selection box 112.

In some implementations, answers and affirmations provided by the user can be stored and reported for use in compliance analysis and reporting.

Referring to FIG. 1B, other questions asked by the digital investment advisor can included. For example, the questions can include the name of a goal 114, 116 (which the user can answer using a text entry dialog 116); whether the user has set aside money in an emergency fund 120 (which the user can answer using a dialog selection 122), and the amount of the user wishes to save 124 (which the user can answer using the text entry dialog 126).

Referring to FIG. 1C, the digital investment advisor can also offer to guide the user through particular tasks, for example, selecting a risk level 128, 130. The user can answer using a selection dialog 132. If the user excepts the offer for assistance, the digital investment advisor can offer to guide the user by providing additional information 134, 136. As described above, the user can select the risk level using a slider dialog 138. When the user moves the slider, the values in the dialog can change to reflect the current value. For example, the different values for the risk profile can include conservative, moderately conservative, moderate, moderately aggressive, and aggressive.

In some cases, the text in the dialog can change based on the circumstances. For example, if the digital investment advisor recommends a particular risk level, and the user selects a different one the text above can be preceded with "Just to be sure, you have chosen a portfolio different than my suggestion."

In response to the responses provided by the user, the system can create an investment account for the user. In some implementations, the system can identify appropriate accounts already held by the user. The system can ask the user if they wish to use the appropriate account or to open a new account.

It should be understood that the examples provided in FIG. 1A-C illustrate only a sample of the conversational possibilities between the user and the digital investment advisor. One of the advantages associated with using a guided conversation as a model for collecting information from the user which can be easily expanded to convey and/or collect additional information. Rather than undergo a lengthy and relatively expensive development effort, a development merely needs to update the script.

Figure 2:
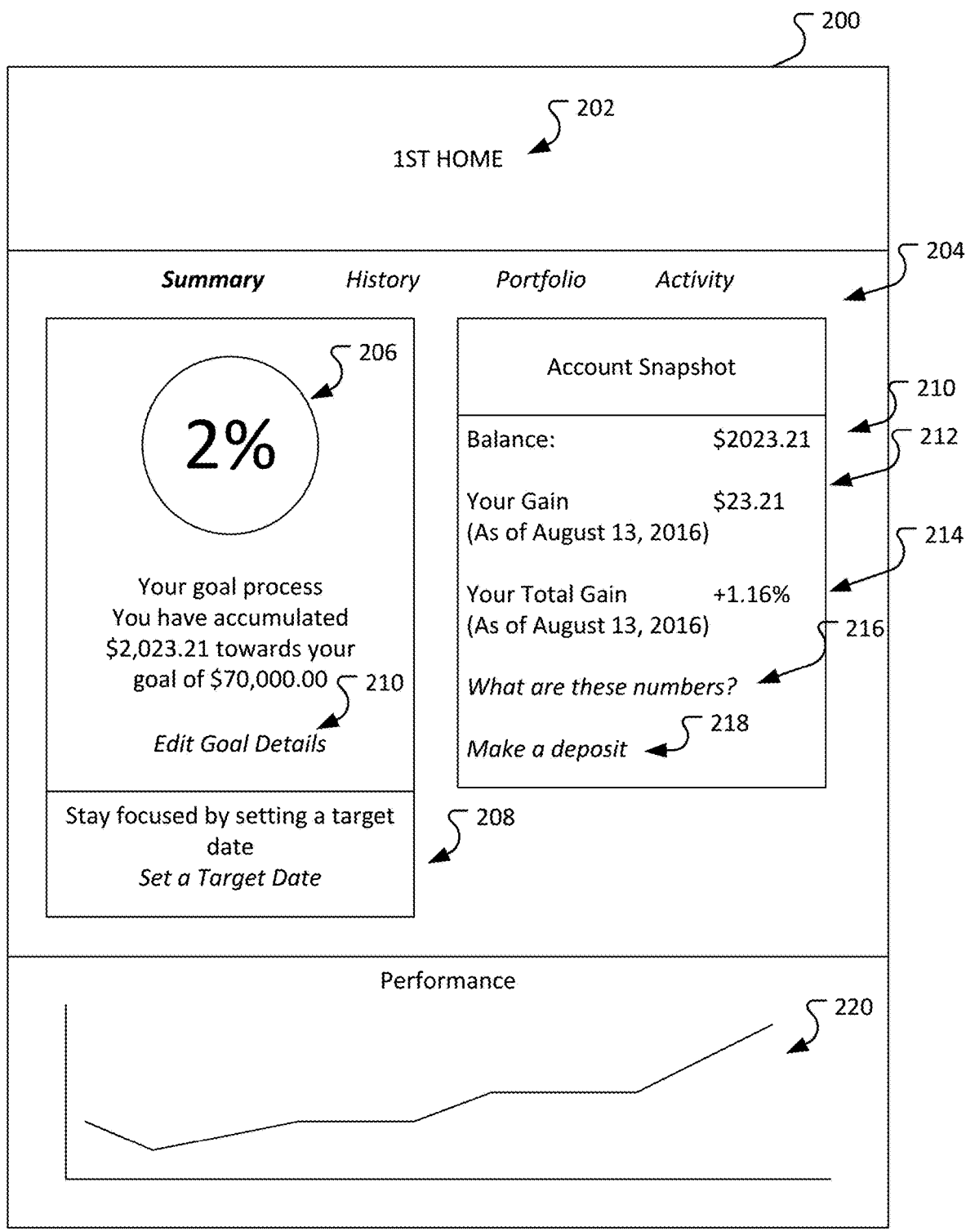
FIG. 2 illustrates an example of a user interface for viewing a user's established goals.

FIG. 2 illustrates an example of a user interface for viewing a user's established goals. A user can be able to view details about their goals in a user interface 200, for example, presented to the user using an application or a web page. The application can be, for example, an application installed on a mobile device, such as a smartphone. The web page can be viewed in a web browser.

The user interface 200 can identify the goal 202 the user is viewing. In some implementations, the user interface can enable to select between different goals. For example, a user can have established a goal for their first home, college savings, and retirement. In this example, the user is viewing the 1st Home goal. A goal summary user interface 204 can include information 206 about the user's progress toward their goal. If the user has not established a target date for the goal, the user interface can provide a link where the user can establish a target date. If the user has established a target date 208 for the goal, the summary user interface 204 can enable the user to set one.

In some implementations, the goal summary user interface can enable the user to edit the goal details. For example, selecting the edit goals link 210 can cause the user to reenter into a chat dialog that enables the user to reset their goals, as described above. In some implementations, selecting the edit goals link can cause the user to be presented with a screen allowing the user to easily edit the parameters that define the goal, including, for example, goal name, goal amount, and target date. A user can be able to select which interface they prefer (chat interface vs. traditional interface) based on a parameter in a user profile.

The goal summary user interface 204 can include information about the account balance 210, the gain or loss 212 that the account has experienced since a predetermined date (for example, since the last statement, in the last month, or in the last year). The goal summary interface can also illustrate the percentage gain or loss over the same period 214.

The user can have the ability to select links (such as link 216) that provide additional information about the summary information, such as the meaning of the account balance, gain, and total gain. The user can also be able to select a link 218 that enables the user to make a deposit.

The goal summary user interface can also include a graph 220 that shows the performance of the portfolio associated with the goal over a period (for example, weekly, monthly, annual, or since the goal was established).

Figure 3:
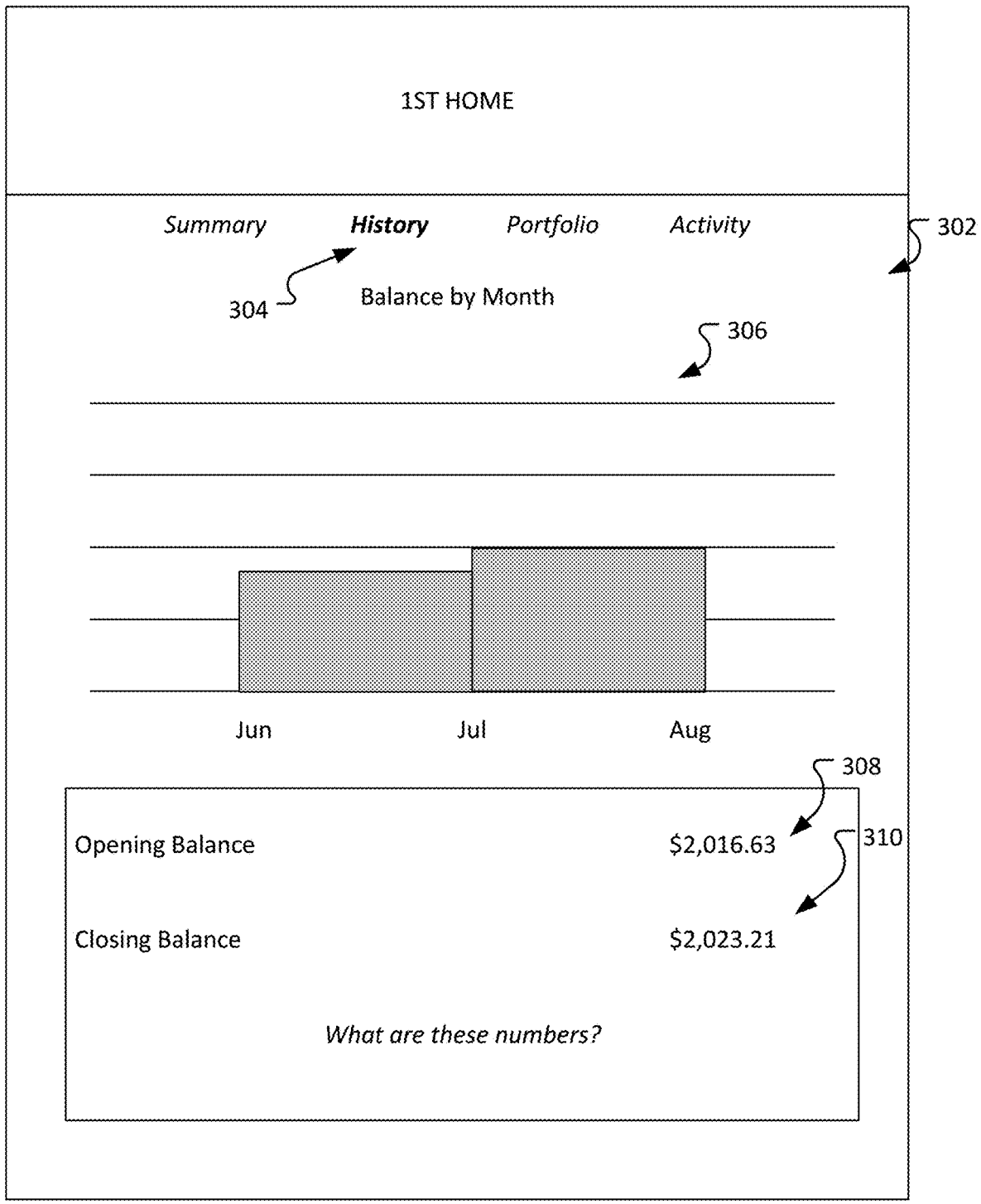
FIG. 3 illustrates an example of a user interface displaying history associated with the goal.

FIG. 3 illustrates an example of a user interface displaying history associated with the goal. The user can navigate to a goal history user interface 302, for example, by selecting the history link 304. The goal history page can show a graphical representation 306 of the value of the account since the goal was established, including, for example, an opening balance 308 and a closing balance 310. In some implementations, the user can change the duration of the history being viewed, for example, the last week, the last month, the last year, or since the goal was established.

Figure 4:
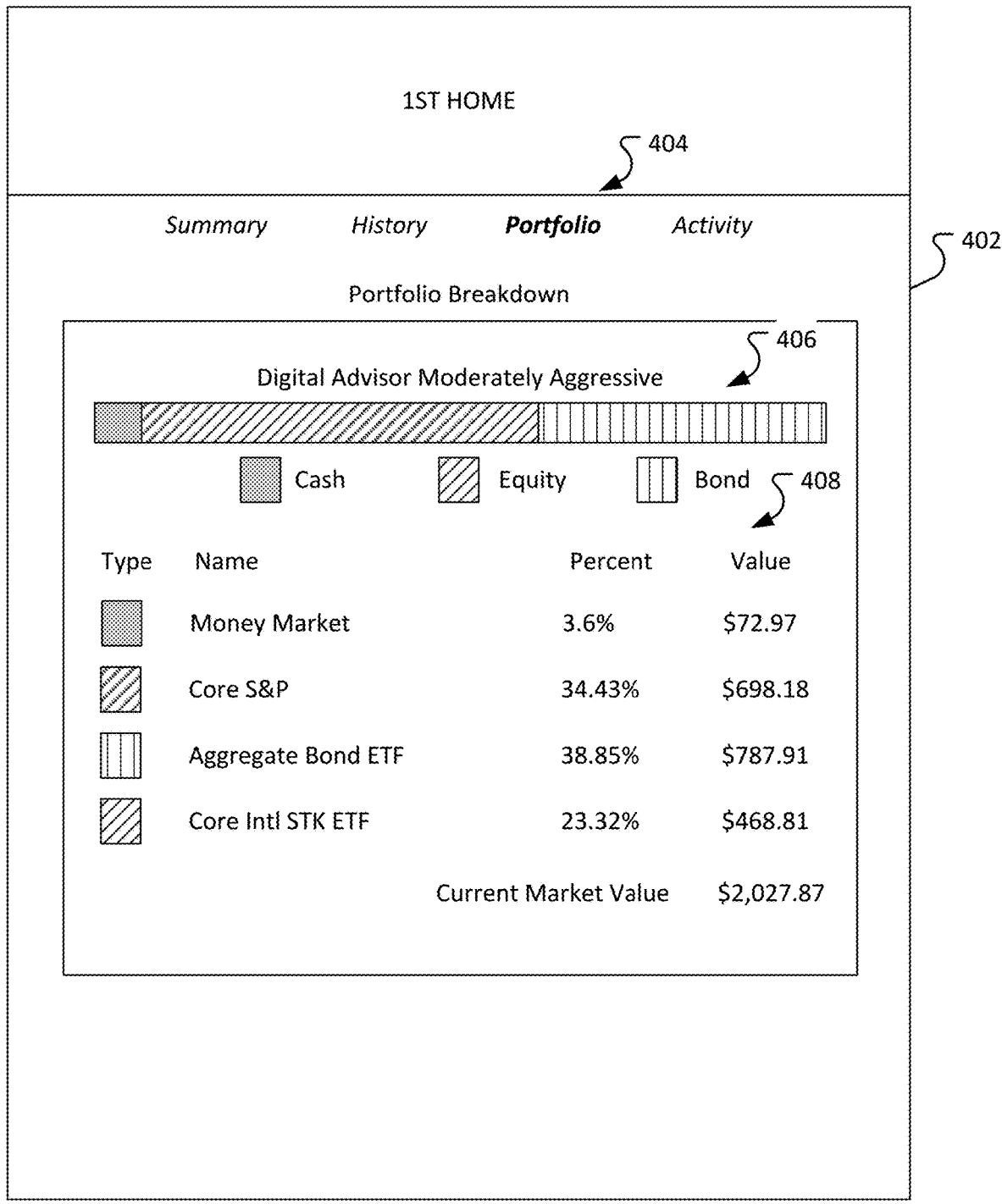
FIG. 4 illustrates an example of a user interface displaying a portfolio associated with the goal.

FIG. 4 illustrates an example of a user interface displaying a portfolio associated with the goal. The user can navigate to a portfolio user interface 402, for example, by selecting the portfolio link 404. The portfolio user interface 402 can display the current allocation of investments into different investment vehicles. The horizontal bar 406 illustrates the percentage breakdown between cash, equity, and bond investments. Beneath the bar 406 is a list 408 of the individual investments and an indication as to the type of investment (cash, equity, or bond).

FIG. 5 illustrates an example of a user interface displaying activity associated with the goal. The user can navigate to an activity user interface 502, for example, by selecting the activity link 504. The activity user interface displays a transaction history 506 for transactions associated with the goal. For example, the activity user interface can display transactions made by an investment account associated with the goal, or, in the scenarios where the goal is associated with a non-dedicated investment account (an account that can be used for multiple purposes including one or more goals and other investments), the activity user interface can only display the transactions that are directly attributable to the goal and the investments made in support of the goal.

Figure 6:
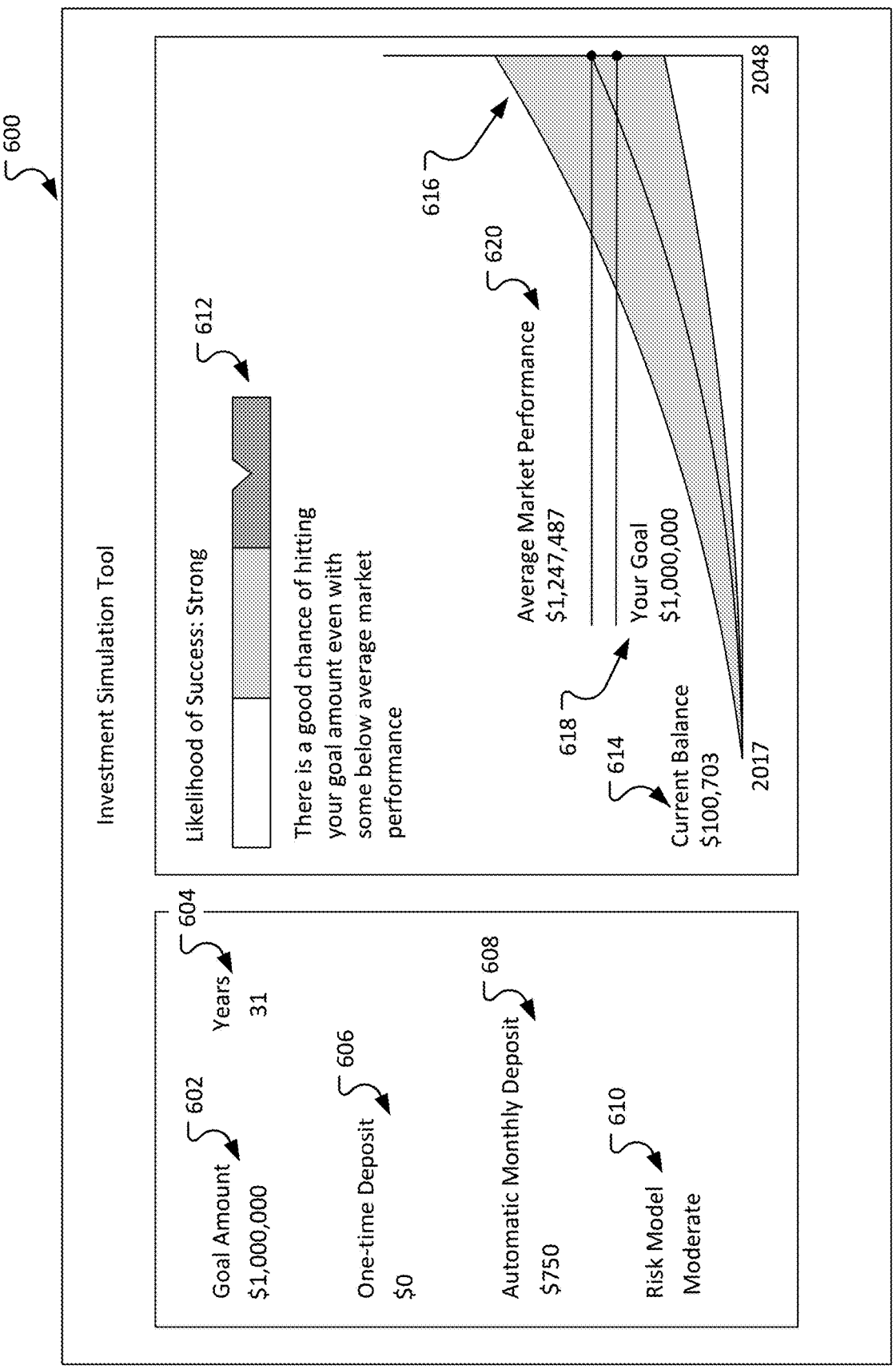
FIG. 6 illustrates an example of an investment simulation tool.

FIG. 6 illustrates an example of an investment simulation tool. The simulation tool can allow a user to set up hypothetical situations based on different investment and saving strategies. The investment simulation tool can be populated with goal data, for example, data populated using the interview technology described above with respect to FIG. 1A-C. For example, the investment simulation tool can display a goal amount 602, a goal term 604, a one-time deposit amount 606, an automatic monthly deposit amount 608, and a risk model 610. Based on these values the investment simulation tool can determine likely outcomes of the investment 616 given a current balance 614. In this example, the graph 616 can display the results of multiple different simulations based on the risk model. The bands on the graph 616 can display a 90% confidence interval about the probable value of the investments. The investment simulation tool 600 can display the average market performance 620 of the investment and compare it to the goal amount 618.

The investment simulation tool 600 can display a graphic 612 that shows the likelihood that the user will reach their goal based on the comparison of the average market performance, the goal amount, and/or the outcome of the multiple simulations. In some implementations, the outcome of the multiple simulations can be provided as a series of percentage bands. By determining in which band the goal amount falls, the investment simulation tool can estimate the likelihood that the user will reach their goal within the goal term.

In some implementations, the investment simulation tool may be presented to a user during account acquisition. For example, during the conversation described above with respect FIG. 1.

Figure 7:
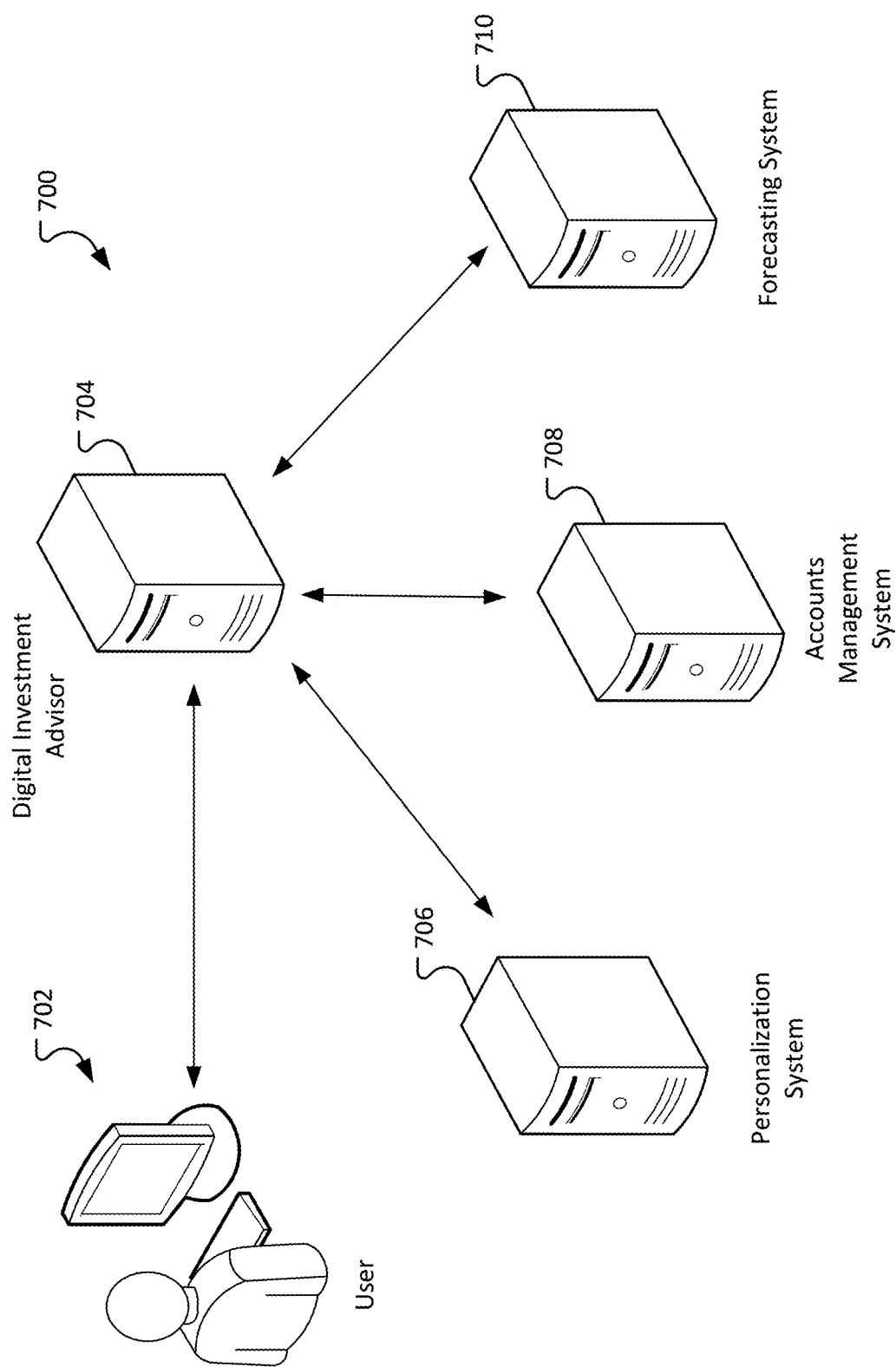
FIG. 7 illustrates an example environment in which a digital investment advisor can operate.

FIG. 7 illustrates an example environment 700 in which a digital investment advisor can operate. A user with a computing device 702 can interact with the digital investment advisor 704 as described above. The digital investment advisor can be being executed by a computing system that includes one or more computers, each computer including a memory and a processor.

The digital investment advisor 704 can send instructions to and receive information from an account management system 708. For example, the digital investment advisor 704 can instruct the account management system 708 to open an account and to provide current balances and transaction history for existing accounts. In some implementations, the digital investment advisor and/or the account management system can identify transactions that are attributable to a particular goal. For example, dividends and interest paid on investments that were purchased to further the investment goal, current value of investments that were purchased to further the investment goal, etc.

The digital investment advisor 704 can interact with a personalization system 706 to provide a more personalized experience to the user. The digital investment advisor and/or the personalization system can infer interests of the user based on the established goals and how close the user is to reaching their goals. Interests can be inferred based on, for example, the name of the goal, the amount of the goal, and the term of the goal. The interests can also be determined based on other information provided by or known about the user. As one example, if a user establishes a goal for "ring" or "engagement" they system can determine that the user is planning to get engaged/married in the near term. If the user establishes a goal for a "car", the system can determine that the user is planning to purchase a car. In some implementations, the amount of the goal can provide additional information, for example, the size of the purchase or the user's budget. For example, the system can determine if the user is planning to purchase a new car or a used car. The goal term can be used to refine the goal. For example, a goal named "Florida" with a term of 20 years is more likely a retirement plan than a vacation.

Once the user's interests have been identified, the personalization system 706 can provide information to the user related to the goal. For example, life insurance, auto insurance, purchasing relationships between the institution that hosts the digital investment advisor and the other organizations, etc.

The digital investment advisor 704 can also interact with a forecasting system 710. The forecasting system can be used to project the future value of the investments related to the goal. The forecasting system can also determine the likelihood that the user will meet their goal within the prescribed timeframe.

While the digital investment advisor 704, the personalization system 706, the account management system 708, and the forecasting system 710 are shown in FIG. 7 as separate computers, it should be understood, that these systems can be executed using many different configurations of computer hardware. In some implementations, these systems can be co-located in whole or in part on one or more computer systems, for example, the digital investment advisor 704 can be hosted by the same computer system that hosts the forecasting system 710.

FIG. 8A-D is a table defining an example scripted conversation for a main path of the digital investment advisor. The table 800*a-d* contain details about the scripted conversation. The scripted conversation may be used to define the digital conversation between the user (member) and the digital investment advisor. The main column 802 includes reference numbers that enable the conversation to jump to different points. As described above, the user can be a member of a financial institution.

The DIA column 804 includes text presented to a member in the chat window. The contents of the text can be personalized for a particular user. For example, the brackets ("[", "]") in cell 810 indicate that the DIA should insert the name of the member.

The Member column 806 includes information about responses that are available to the member. The A, B selection options 812, indicate that the member is to be presented with a choice between those options. The input command 816 indicates that the member is to be prompted to enter text. The conditional statement 818 illustrates how values provided by the member can cause different language to be presented. For example, the conversation goes in one direction if the user enters an amount below $2,000 and a different direction if the user enters an amount of $2,000 or above. The slider option 820 indicates that the member is to be presented with a slider that includes the options defined by the choices in the table.

The destination column 808 identifies a location in the conversation where the DIA should go in response to particular options selected by the member. For example, referring to FIG. 8A, if the member selections option A 812, the destination column value 820 indicates that the digital investment advisor to proceed to Step 2 822 of the main conversation. If, on the other hand, the member selects option B 814, the destination column value 824 indicates that the digital investment advisor to proceed to Step 1 of the alternate conversation 1 (902 of FIG. 9) and the digital investment advisor proceeds to step 1 or the alternative 1 conversation.

FIG. 9 is a table 900 defining an example alternate scripted conversation for a main path of the digital investment advisor.

FIG. 10 is a table 1000 defining an example alternate scripted conversation for a main path of the digital investment advisor.

FIG. 11 is a table 1100 defining an example alternate scripted conversation for a main path of the digital investment advisor.

FIG. 12 is a table 1200 defining an example alternate scripted conversation for a main path of the digital investment advisor.

FIG. 13 is a table 1300 defining an example alternate scripted conversation for a main path of the digital investment advisor.

FIG. 14 is a table 1400 defining an example alternate scripted conversation for a main path of the digital investment advisor.

FIG. 15 is a table 1500 defining an example alternate scripted conversation for a main path of the digital investment advisor.

FIG. 16A-C is a table 1600*a-c* defining an example alternate scripted conversation for a main path of the digital investment advisor.

FIG. 17 is a table 1700 defining an example alternate scripted conversation for a main path of the digital investment advisor.

Figure 18:
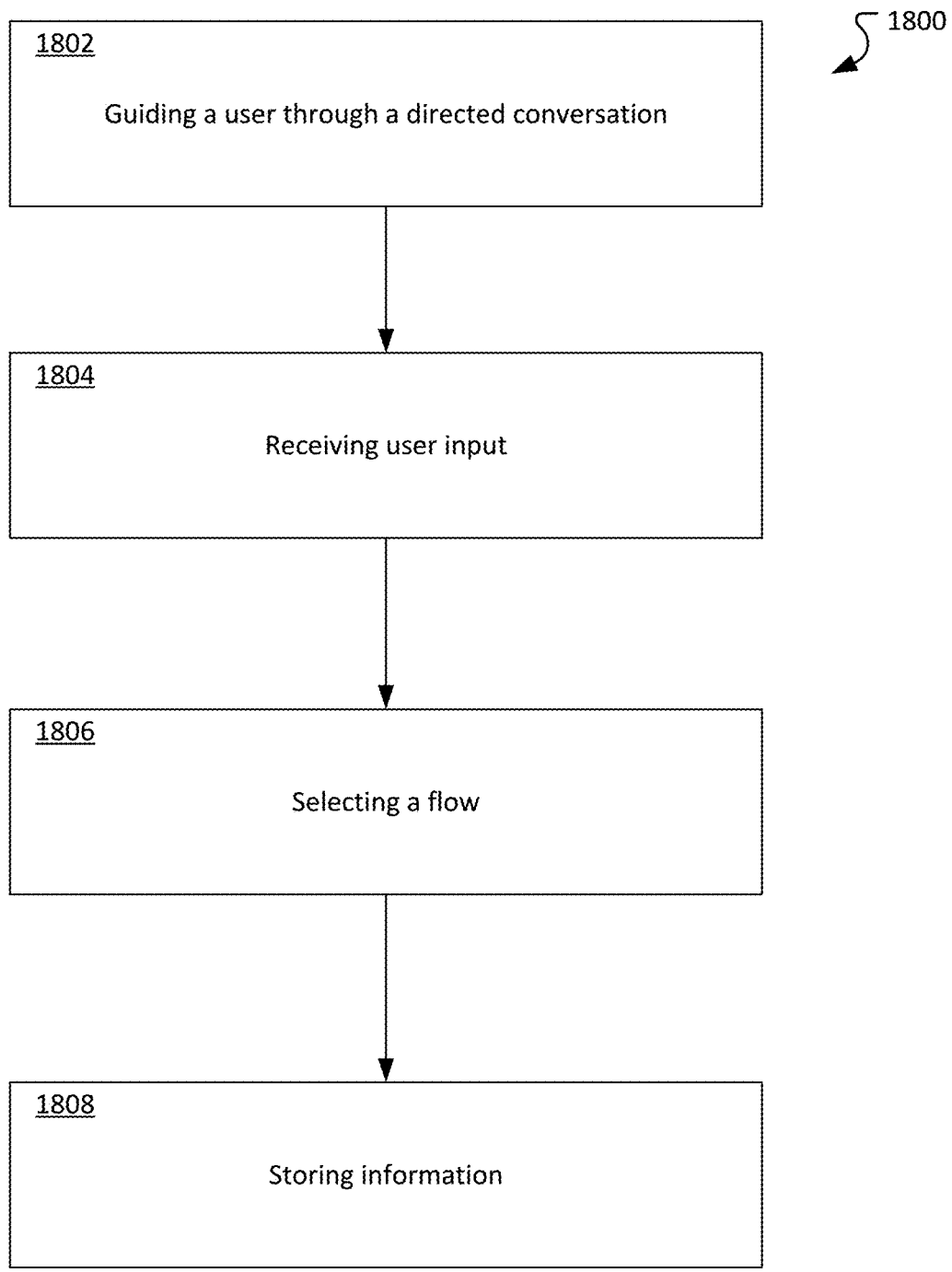
FIG. 18 is a flowchart of an example process 1800 for presenting a guided conversation.

FIG. 18 is a flowchart of an example process 1800 for presenting a guided conversation.

The process 1800 guides a user through a directed conversation. The conversation can include a series of flows. For example, the main flow, and one or more alternate flows. Each of the flow can include statements that are to be made by a digital advisor. The flows can include mechanisms whereby the user can provide input to the process, as described above. The process 1800 guides 1802 a user through a directed conversation.

The process 1800 receives 1804 user input as part of the directed conversation.

The process 1800 selects 1806 a flow based on the received user input. For example, each potential response by the user can be associated with a location within one of the flows in the directed conversation. When the user selects a response, the conversation is directed to the corresponding flow.

The process 1800 stores 1808 at least some of the information provided by the user in a data store.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the preceding. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or another unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can, in some cases, be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
receiving a service request from a user computing device;
responsive to receiving the service request, executing a directed conversation through a digital advisor, the directed conversation comprising a plurality of editable tables, each of the plurality of editable tables being linked to a primary table through a respective destination identifier, wherein the primary table represents a primary conversation flow of the directed conversation;
providing, for display in a user interface on the user computing device and from the primary table, a first question with at least two user selectable responses, wherein one of the user selectable responses is associated with a destination identifier of a first one of the plurality of editable tables that represents a sub-conversation flow relevant to the associated user selectable response;
receiving user input indicating a selection of the user selectable response that is associated with the destination identifier;
responsive to the user input, accessing the first one of the plurality of editable tables based on the destination identifier;
providing, for display on the user computing device, conversational output from the first one of the plurality of editable tables;
providing, for display on the user computing device and from one of the plurality of editable tables, a second question and a second user selectable response, wherein the second user selectable response comprises a slider bar presented in a conversation bubble of the user interface, and wherein at least one position of the slider bar is associated with a destination identifier of a second one of the plurality of editable tables that represents a sub-conversation flow relevant to the associated at least one position of the slider bar; and
responsive to user input changing a position of a slider in the slider bar, modifying text displayed in the user interface to reflect a current position of the slider in the slider bar.

2. The computer-implemented method of claim 1, wherein each editable table of the plurality of editable tables defines statements and inputs to be provided by the user.

3. The computer-implemented method of claim 1, wherein the directed conversation includes statements and responses determined by regulatory requirements.

4. The computer-implemented method of claim 1, wherein at least one of the primary conversation and the sub-conversation flow in the plurality of editable tables can be updated without altering the user interface.

5. The computer-implemented method of claim 1, further comprising:
determining an interest of the user based on the received user input; and
personalizing a subsequent conversation output based on the determined interest.

6. The computer-implemented method of claim 1, further comprising establishing an account to achieve a financial goal based on the directed conversation.

7. A non-transitory computer storage medium encoded with computer program instructions that when executed by one or more computers cause the one or more computers to perform operations comprising:
receiving a service request from a user computing device;
responsive to receiving the service request, executing a directed conversation through a digital advisor, the directed conversation comprising a plurality of editable tables, each of the plurality of editable tables being linked to a primary table through a respective destination identifier, wherein the primary table represents a primary conversation flow of the directed conversation;
providing, for display in a user interface on the user computing device and from the primary table, a first question with at least two user selectable responses, wherein one of the user selectable responses is associated with a destination identifier of a first one of the plurality of editable tables that represents a sub-conversation flow relevant to the associated user selectable response;
receiving user input indicating a selection of the user selectable response that is associated with the destination identifier;
responsive to the user input, accessing the first one of the plurality of editable tables based on the destination identifier;
providing, for display on the user computing device, conversational output from the first one of the plurality of editable tables;
providing, for display on the user computing device and from one of the plurality of editable tables, a second question and a second user selectable response, wherein the second user selectable response comprises a slider bar presented in a conversation bubble of the user interface, and wherein at least one position of the slider bar is associated with a destination identifier of a second one of the plurality of editable tables that represents a sub-conversation flow relevant to the associated at least one position of the slider bar; and
responsive to user input changing a position of a slider in the slider bar, modifying text displayed in the user interface to reflect a current position of the slider in the slider bar.

8. The non-transitory computer storage medium of claim 7, wherein each editable table of the plurality of editable tables defines statements and inputs to be provided by the user.

9. The non-transitory computer storage medium of claim 7, wherein the directed conversation includes statements and responses determined by regulatory requirements.

10. The non-transitory computer storage medium of claim 7, wherein at least one of the primary conversation and the sub-conversation flow in the plurality of editable tables can be updated without altering the user interface.

11. The non-transitory computer storage medium of claim 7, wherein the operations further comprise:
determining an interest of the user based on the received user input; and
personalizing a subsequent conversation output based on the determined interest.

12. A system comprising:
one or more computers and one or more storage devices storing instructions that are operable, when executed by the one or more computers, to cause the one or more computers to perform operations comprising:
receiving a service request from a user computing device;
responsive to receiving the service request, executing a directed conversation through a digital advisor, the directed conversation comprising a plurality of editable tables, each of the plurality of editable tables being linked to a primary table through a respective destination identifier, wherein the primary table represents a primary conversation flow of the directed conversation;

providing, for display in a user interface on the user computing device and from the primary table, a first question with at least two user selectable responses, wherein one of the user selectable responses is associated with a destination identifier of a first one of the plurality of editable tables that represents a sub-conversation flow relevant to the associated user selectable response;

receiving user input indicating a selection of the user selectable response that is associated with the destination identifier;

responsive to the user input, accessing the first one of the plurality of editable tables based on the destination identifier;

providing, for display on the user computing device, conversational output from the first one of the plurality of editable tables;

providing, for display on the user computing device and from one of the plurality of editable tables, a second question and a second user selectable response, wherein the second user selectable response comprises a slider bar presented in a conversation bubble of the user interface, and wherein at least one position of the slider bar is associated with a destination identifier of a second one of the plurality of editable tables that represents a sub-conversation flow relevant to the associated at least one position of the slider bar; and responsive to user input changing a position of a slider in the slider bar, modifying text displayed in the user interface to reflect a current position of the slider in the slider bar.

13. The system of claim 12, wherein each editable table of the plurality of editable tables defines statements and inputs to be provided by the user.

14. The system of claim 12, wherein the directed conversation includes statements and responses determined by regulatory requirements.

15. The system of claim 12, wherein at least one of the primary conversation and the sub-conversation flow in the plurality of editable tables can be updated without altering the user interface.

16. The system of claim 12, where the operations further comprise:
   determining an interest of the user based on the received user input; and
   personalizing a subsequent conversation output based on the determined interest.

17. The computer-implemented method of claim 1, wherein modifying the text displayed in the user interface comprises obtaining, from the one of the plurality of editable tables and based on the current position of a sider in the slider bar, text that is descriptive of the current position of the slider in the slider bar.

18. The computer-implemented method of claim 1, wherein the user interface comprises one of an instant message interface, a chat interface, or a SMS messaging interface.

19. The non-transitory computer storage medium of claim 7, wherein the user interface comprises one of an instant message interface, a chat interface, or a SMS messaging interface.

20. The system of claim 12, wherein the user interface comprises one of an instant message interface, a chat interface, or a SMS messaging interface.

* * * * *